United States Patent [19]
Tsai

[11] Patent Number: 6,071,383
[45] Date of Patent: Jun. 6, 2000

[54] DISTILLATOR

[76] Inventor: Chin-Chren Tsai, 58, Ma Yuan West St., Taichung, Taiwan

[21] Appl. No.: 09/197,034

[22] Filed: Nov. 20, 1998

[51] Int. Cl.[7] .................................................. B01D 3/00
[52] U.S. Cl. ..................... 202/167; 122/1 C; 202/176; 202/186; 203/10; 203/21; 203/22
[58] Field of Search ..................................... 202/167, 176, 202/186; 203/10, 21, 22, 100, DIG. 8; 122/1 C

[56] References Cited

U.S. PATENT DOCUMENTS

| | | | |
|---|---|---|---|
| 4,953,694 | 9/1990 | Hayashi et al. | 202/180 |
| 5,565,065 | 10/1996 | Wang | 202/176 |

*Primary Examiner*—Hien Tran
*Assistant Examiner*—Frederick Varcoe, Jr.

*Attorney, Agent, or Firm*—Alan Kamrath; Oppenheimer Wolff & Donnelly, LLP

[57] ABSTRACT

A distillator has an outer casing, a boiling device disposed in the outer casing, a hot water box disposed in the outer casing, a cold water box disposed in the outer casing, a first faucet disposed on the hot water box, a second faucet disposed on the cold water box, a first vapor pipe connected to the boiling device and the hot water box, a second vapor pipe connected to the hot water box and the cold water box, a water pipe connected to the boiling device and the cold water box and passing through the hot water box, the water pipe inserted in the first vapor pipe and the second vapor pipe, a heating device disposed on the boiling device, and a heater disposed on the hot water box. A connection is disposed on an end of the water pipe and passes through the cold water box.

2 Claims, 3 Drawing Sheets

DISTILLATOR

BACKGROUND OF THE INVENTION

The present invention relates to a distillator. More particularly, the present invention relates to a distillator which can provide hot distilled water.

A conventional distillator can provide cold distilled water only. The conventional distillator has a water container, a heating pipe to evaporize water in the water container, and a condenser device to distill vapor into cold distilled water. When cold water adds into the water container, the temperature of the boiling water will be decreased significantly.

SUMMARY OF THE INVENTION

An object of the present invention is to provide a distillator which can provide hot distilled water.

Another object of the present invention is to provide a distillator which can provide cold distilled water.

Another object of the present invention is to provide a distillator which can provide distilled water effectively and continuously.

Accordingly, a distillator comprises an outer casing, a boiling device disposed in the outer casing, a hot water box disposed in the outer casing, a cold water box disposed in the outer casing, a first faucet disposed on the hot water box, a second faucet disposed on the cold water box, a first vapor pipe connected to the boiling device and the hot water box, a second vapor pipe connected to the hot water box and the cold water box, a water pipe connected to the boiling device and the cold water box and passing through the hot water box, the water pipe inserted in the first vapor pipe and the second vapor pipe, a heating device disposed on the boiling device, and a heater disposed on the hot water box. A connection is disposed on an end of the water pipe and passes through the cold water box.

DETAILED DESCRIPTION OF THE INVENTION

Figure 1:
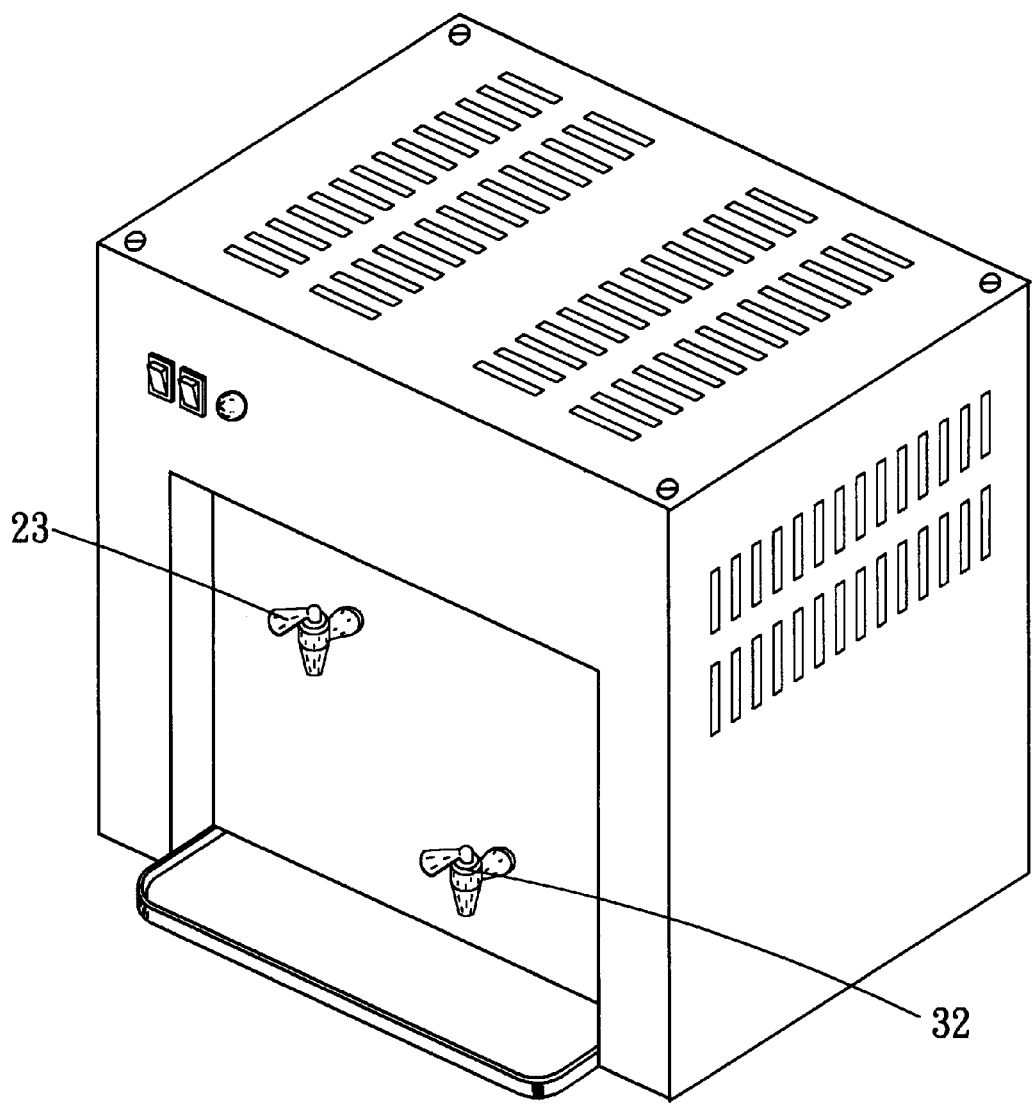
FIG. 1 is a perspective view of a distillator of a preferred embodiment in accordance with the present invention.
Figure 2:
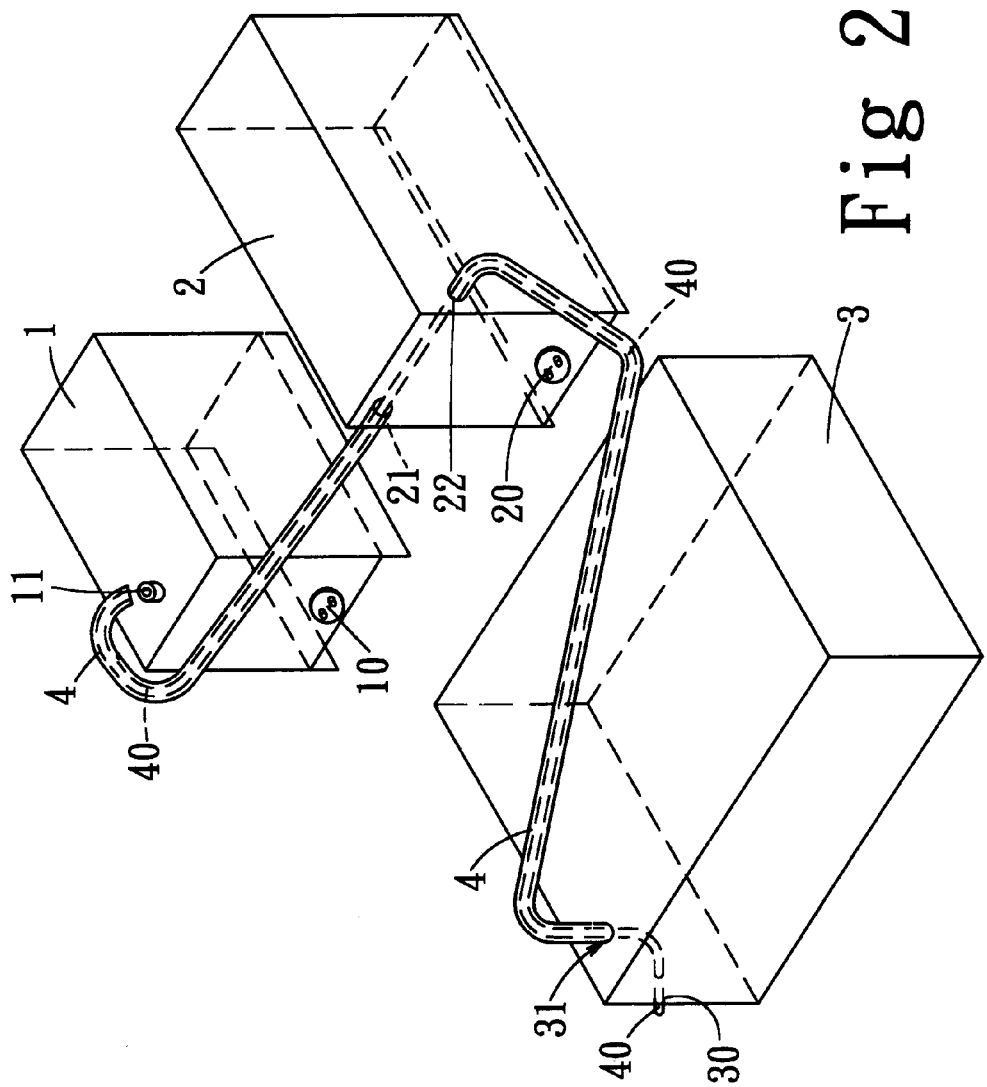
FIG. 2 is a perspective view of a distillator of a preferred embodiment without a casing.
Figure 3:
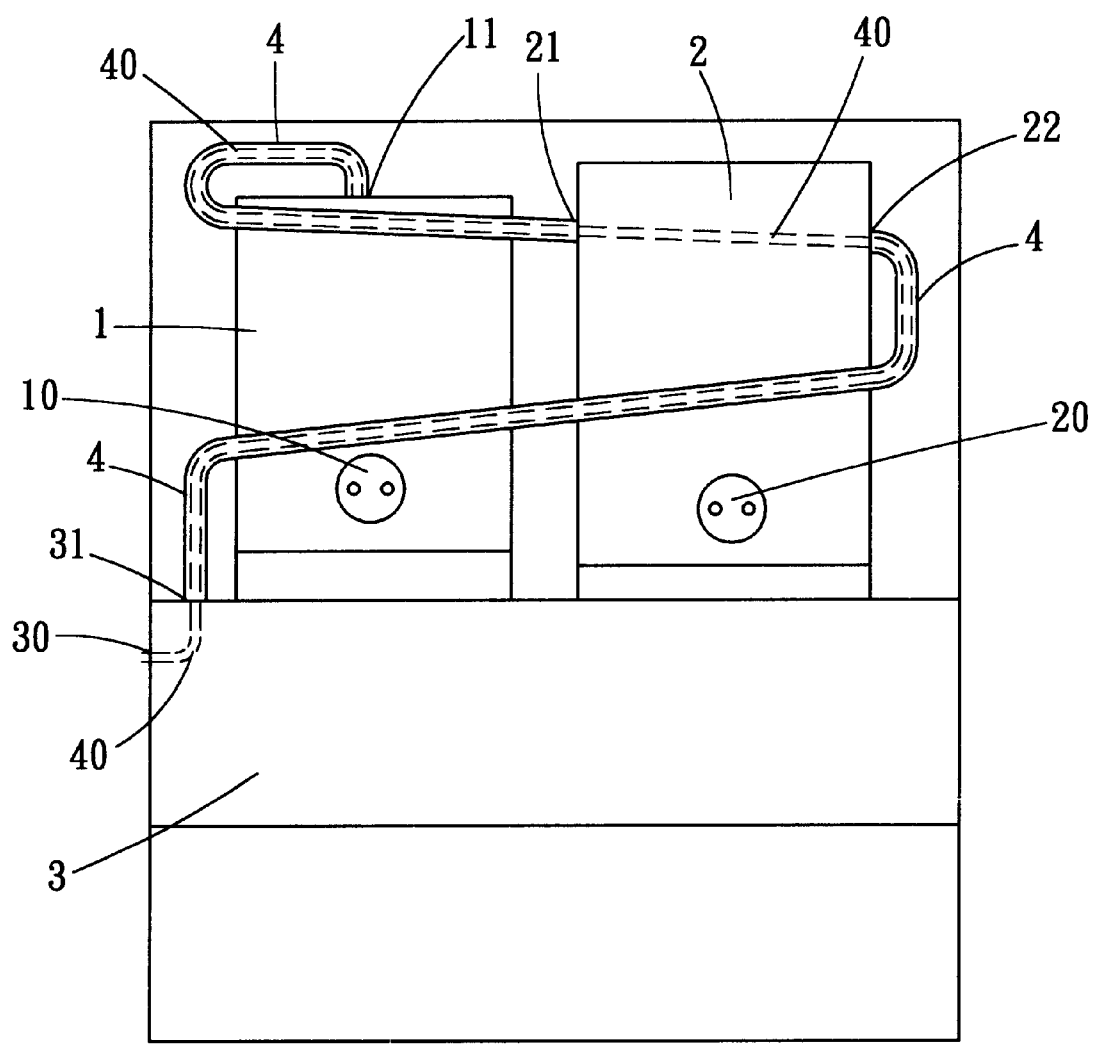
FIG. 3 is a schematic view illustrating an assembly of a distillator of a preferred embodiment in accordance with the present invention.

Referring to FIGS. 1 to 3, a distillator comprises an outer casing, a boiling device 1 disposed in the outer casing, a hot water box 2 disposed in the outer casing, a cold water box 3 disposed in the outer casing, a first faucet 23 disposed on the hot water box 2, a second faucet 32 disposed on the cold water box 3, a first vapor pipe 4 connected to the boiling device 1 and the hot water box 2, a second vapor pipe 4 connected to the hot water box 2 and the cold water box 3, a water pipe 40 connected to the boiling device 1 and the cold water box 3 and passing through the hot water box 2, the water pipe 40 inserted in the first vapor pipe 4 and the second vapor pipe 4, a heating device 10 disposed on the boiling device 1, a joint 11 disposed on the boiling device 1, and a heater 20 disposed on the hot water box 2. A connection 30 is disposed on an end of the water pipe 40 and passes through the cold water box 3. A first coupler 21 is disposed between the first vapor pipe 4 and the hot water box 2. A second coupler 22 is disposed between the second vapor pipe 4 and the hot water box 2. A water conduit (not shown in the figures) is connected to the connection 30. Cold water flows from the water conduit to the connection 30 and then to the water pipe 40. Since the vapor flows from the hot water box 2 to the cold water box 3 via the second vapor pipe 4, the cold water in the water pipe 40 will become warm water. Since the vapor flows from the boiling device 1 to the hot water box 2, the warm water in the water pipe 40 will become hot water. The hot water will not decrease the temperature of the boiling device 1 significantly, so the boiling device 1 can produce distilled water continuously.

The invention is not limited to the above embodiment but various modification thereof may be made. Further, various changes in form and detail may be made without departing from the scope of the invention.

I claim:

1. A distillator comprising:

an outer casing, a boiling device disposed in the outer casing, a hot water box disposed in the outer casing, a cold water box disposed in the outer casing, a first faucet disposed on the hot water box, a second faucet disposed on the cold water box, a first vapor pipe connected to the boiling device and the hot water box, a second vapor pipe connected to the hot water box and the cold water box, a water pipe connected to the boiling device and the cold water box and passing through the hot water box, the water pipe inserted in the first vapor pipe and the second vapor pipe, a heating device disposed on the boiling device, and a heater disposed on the hot water box.

2. A distillator as claimed in claim 1, wherein a connection is disposed on an end of the water pipe and passes through the cold water box.

* * * * *